Feb. 5, 1946.   H. J. BUTLER   2,394,290
WHEEL EQUIPMENT
Filed Oct. 25, 1944
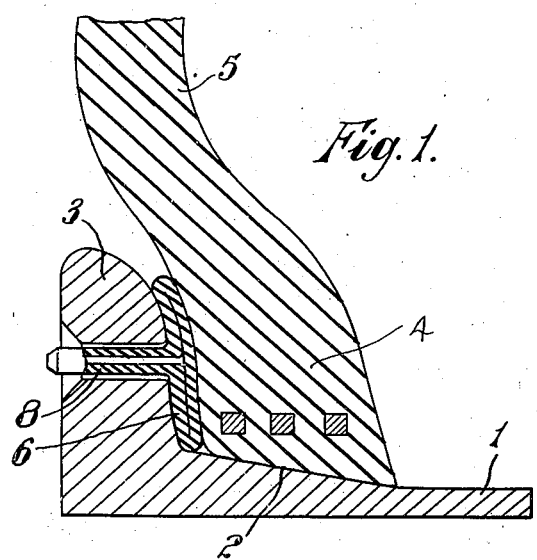
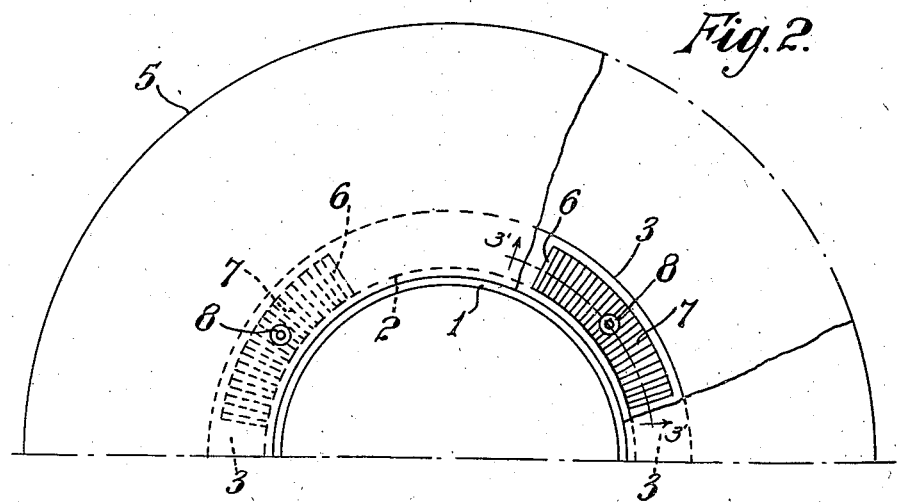
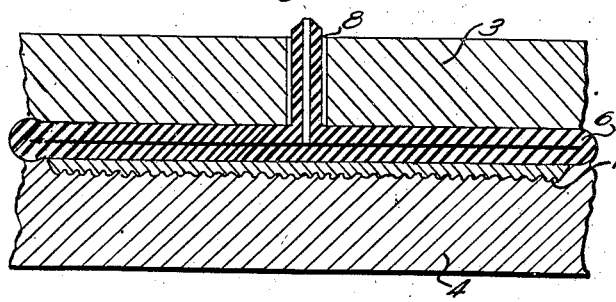
Inventor
Henry James Butler
by Benj. T. Rauber
his attorney Patented Feb. 5, 1946

2,394,290

UNITED STATES PATENT OFFICE 2,394,290

WHEEL EQUIPMENT

Henry James Butler, Sutton Coldfield, England, assignor to Dunlop Rubber Company Limited, London County, England, a British company Application October 25, 1944, Serial No. 560,282
In Great Britain October 23, 1943

5 Claims. (Cl. 152—330)

My invention relates to improvements in wheel equipment for aircraft and other vehicles having pneumatic tires the removal of which from their rims is commonly effected by extraneous mechanical aids such as tire tools or spanners the leverage of which is concentrated at localised areas around the rim or wheel with the liability of damage thereto particularly when such rim or wheel is composed of light weight metal alloy.

The invention has for its object to facilitate the separation of a pneumatic tire from a rim or wheel in a manner adapted to obviate damage to the wheel and tire attendant upon the use of extraneous mechanical devices.

According to this invention wheel equipment comprises a wheel a pneumatic tire and means adapted to contain fluid under pressure to loosen a bead of said tire from rim of said wheel.

Preferably said means comprise a distensible tube located between the flange of said rim and the bead of said tire.

The tube may be provided with a metallic wall portion adapted to contact with the tire bead and such metallic wall portion may be provided with a corrugated surface adapted to be pressed into the tire bead to prevent relative rotation between the tire bead and the rim flange. A plurality of such tubes may be provided spaced apart around the rim.

In order that my invention may be more clearly understood and readily carried into practical effect reference is made, in further describing the same, to the accompanying drawing wherein—

Fig. 1 is a part sectional view of a pneumatic tire mounted on a tire retaining rim provided with means to free the bead from the rim in accordance with the invention.

Fig. 2 is a fragmentary side view on a smaller scale of a pneumatic tire and rim provided with a modification of the bead loosening means in accordance with the invention.

Fig. 3 is a section taken on line 3'—3' of Fig. 2.

The invention is illustrated in the accompanying drawing with reference to a rim 1 having an inclined tire bead seating surface 2 and a flange 3 adapted to retain the tire bead 4, Fig. 1, on the tire bead seating surface 2 upon which said bead is firmly wedged by the inflation pressure applied to the internal surface of the tire cover 5.

Between the outer wall of the tire bead 4 and the internal face of the bead retaining rim flange 3 is disposed a distensible tube 6 or a plurality of such tubes spaced circumferentially apart around the rim as shown in Fig. 2. In the construction shown in Fig. 1 the tube is an endless inflatable tube of rubber or the like preferably premoulded to conform to the cross-sectional profile of the flange 3, whereas in the construction shown in Figs. 2 and 3 a plurality of segmental tubes are employed. The tube or tubes are preferably moulded in a flattened condition and to a cross-section of which the profile conforms to the curvature of the rim flange in which an annular recess or series of such recesses may be provided to accommodate such tube or tubes.

In a modification a tube may be employed composed partly of rubber and partly of metal such composite tube incorporating a metallic wall portion conforming to the shape of the tire bead and adapted to be pressed into frictional contact therewith. The metallic wall portion is bonded or otherwise secured at its edges to the rubber wall portion which is positioned for distension against the face of the bead retaining rim flange and in order to increase the adhesion of the metallic wall of the tube contacting with the tire bead, the metallic wall may be roughened or provided with a knurled surface or like protuberances and indentations preferably in the form of corrugations having radially extending ridges 7, as indicated in Figs. 2 and 3.

The distention of the tube or tubes is conveniently effected through a valve connection having a tubular stem 8 which may be composed of rubber or the like moulded integral with the tube 6, the stem of such connection extending outwardly through an aperture formed in the flange 3, Fig. 1, or being led over the rim flange between such flange and the wall of the tire cover. The outer ends of the valve connections may be provided with a non-return valve of any convenient standard type.

Having described my invention, what I claim is:

1. In combination a wheel having a flange, a pneumatic tire having a bead portion to abut against said flange and a flat distensible tube between said flange and said bead and having a stem projecting through said flange.

2. In combination, a wheel having a flange, a pneumatic tire having a bead portion to abut against said flange and a fluid distensible means between said flange and the bead of said tire.

3. In combination, a wheel having a flange, a pneumatic tire having a bead portion to abut against said flange and a fluid distensible tube between the flange of said rim and the bead of the tire.

4. In combination, a wheel having a flange, a pneumatic tire having a bead portion to abut against said flange, a fluid distensible tube between the flange of said rim and the bead of the tire, and a metallic wall bonded to the distensible tube and positioned between the tube and the tire bead.

5. In combination, a wheel having a flange, a pneumatic tire having a bead portion to abut against said flange, and tube sections spaced about said rim between said flange and said tire and inflatable to move the bead of said tire from said flange.

HENRY JAMES BUTLER.